United States Patent

Norris et al.

[11] Patent Number: 5,401,126
[45] Date of Patent: Mar. 28, 1995

[54] TOOL FOR REMOVING END OF CUT-OFF PIPE FROM A PIPE COUPLING

[76] Inventors: Duane Norris, 726 "J" Pl., Chula Vista, Calif. 92010; Steve Cromer, 1363 Judson Way, Chula Vista, Calif. 92011

[21] Appl. No.: 26,262

[22] Filed: Mar. 4, 1993

Related U.S. Application Data

[63] Continuation of Ser. No. 643,453, Jan. 17, 1991, abandoned.

[51] Int. Cl.⁶ .............................................. B23B 51/02
[52] U.S. Cl. .................................... 408/225; 408/82; 408/227
[58] Field of Search ............... 7/157; 408/80, 81, 82, 408/201, 223, 224, 225, 227, 229

[56] References Cited

U.S. PATENT DOCUMENTS

| | | | |
|---|---|---|---|
| D. 170,119 | 8/1953 | Hull | 7/157 |
| 1,418,485 | 6/1922 | Smith | 408/224 |
| 1,620,536 | 3/1927 | Gairing | 408/225 |
| 1,711,012 | 4/1929 | Brandt | 408/224 |
| 2,389,909 | 11/1945 | Hofbauer | 408/224 |
| 2,761,335 | 9/1956 | Bernardi | 408/224 |
| 2,897,696 | 8/1959 | Tisserant | 408/225 |
| 3,028,772 | 4/1962 | Mossberg | 408/201 |
| 3,532,010 | 10/1970 | Klintworth | 408/201 |
| 3,752,593 | 8/1973 | Fitzgerald et al. | 408/225 |
| 3,824,027 | 7/1974 | Janci | 408/225 |
| 4,693,643 | 9/1987 | Keyworth | 408/82 |
| 4,930,948 | 6/1990 | Bowen | 408/225 |
| 4,968,193 | 11/1990 | Chaconas et al. | 408/225 |

FOREIGN PATENT DOCUMENTS

| | | | |
|---|---|---|---|
| 1199146 | 12/1959 | France | 408/226 |
| 540073 | 10/1941 | United Kingdom | 408/224 |

*Primary Examiner*—Daniel W. Howell
*Attorney, Agent, or Firm*—Thomas J. Tighe

[57] ABSTRACT

A bit usable in combination with a rotatory driver, such as a drill, for extracting a remnant of a cut-off pipe from a pipe socket. The bit comprises a forward portion which is a pilot to keep the bit centered in the remnant and thereby centered in the pipe socket, a forward-facing ring cutter whose inner and outer diameters generally match the inner and outer diameters of the pipe remnant being extracted, said ring cutter being operable to cut and/or scrape the remnant edgewise from the socket, and a forward facing ring scraper operable to stop the bit from excessive penetration into the pipe socket and operable to scrape bonding material remnants from the end face of the pipe coupling.

12 Claims, 1 Drawing Sheet

TOOL FOR REMOVING END OF CUT-OFF PIPE FROM A PIPE COUPLING

This is a continuation of application Ser. No. 07/643,453, filed Jan. 17, 1991, now abandoned.

BACKGROUND OF INVENTION

This invention relates in general to devices for removing a remnant of a pipe, which has been cut off, from a pipe socket in which the pipe had been bonded. As used herein, the term "plastic pipe" shall include ABS pipe, PVC pipe and other plastic pipe.

This invention, although useful for other purposes, was original conceived to address a situation where a remnant of a pipe which was connected to an installed coupling has to be removed. This typically arises when a pipe which is part of a pre-existing structure plumbing has to be replaced. Often the pipe that needs to be replaced couples with at least one other pipe through a pipe coupling, such as a "T" coupling. If the pipe to be replaced is a plastic pipe which had been bonded into a coupling socket, conventional practice has been to cut off the pipe at the lip of the coupling and, through various means, remove the remnant of the pipe remaining in the socket. Heretofore, remnants have been removed by methods of chiseling and scraping, i.e., a hammer and chisel has been commonly used to remove such remnants. However, these methods have proved to be very time consuming and often very damaging to the in-place coupling.

U.S. Pat. No. 3,752,593 by Fitzgerald et al., presents a device for removing plastic pipe remnants from coupling sockets. This device has a plurality of cutters radially disposed around the circumference of a hollow can shaped member containing a spring biased pilot adapted to slide in and out of the can member. The diameter of the pilot and width of the cutters are adapted to a particular socket and pipe size. The spring biased pilot guides the tool, i.e. centers the tool in the pipe remnant during operation.

This invention has many advantages over the prior art including the above-discussed patent because it not only cleans out the remnants of the cut-off pipe, but it also squares up and cleans the coupling socket end face from bonding material remnants. In practice this invention can remove a pipe remnant and clean out a pipe socket in three to five seconds when powered by a conventional drill. Moreover, it is a single integral part considerably less expensive to manufacture than the Fitzgerald et al. device and significantly less prone to malfunctions. The Fitzgerald et al. device is subject to having particles of pipe lodged in the pilot cylinder resulting in restricted or jammed movement of the pilot. Moreover, Fitzgerald et al. device does not have a stop to prevent the cutter from penetrating too far. This invention has a stop means which also functions as a socket end face trimmer.

These advantages and others will be further discussed in the text hereafter or will be readily discernable from a reading of the text hereinafter.

SUMMARY OF THE INVENTION

An object of this invention is to provide a tool for easily and quickly removing the remnants of a cut-off pipe from a pipe coupling socket.

A further object of this invention is to provide a tool as described above which includes a stop means to prevent the bit from penetrating too far into the socket.

A further object of this invention is to provide a tool as above-described in the preceding two paragraphs which includes a means for cleaning an end face of the socket.

Other objects of this invention will either be discussed expressly and/or will be readily discernable from a reading of the text hereinafter.

These objects are accomplished by a bit which can be powered by a rotary driver, said bit comprising an elongated shank for coupling the rotational power of the driver to the bit; cutting means spaced radially from the shank and powered by the shank for cutting the pipe remnant edgewise when the device is rotated, e.g., a forward-facing ring cutter coaxially connected to the shank having inner and outer diameters generally matching respectively the inner and outer diameters of the pipe remnant; means for centering and keeping centered the bit axially with respect to the pipe remnant; and means for stopping excessive penetration of the device into the socket. The bit can further comprise means for scraping an end face of the socket to remove old bonding material and other materials foreign to the socket housing, which means can also function as the stop means.

DESCRIPTION OF THE PREFERRED EMBODIMENT

Figure 1:
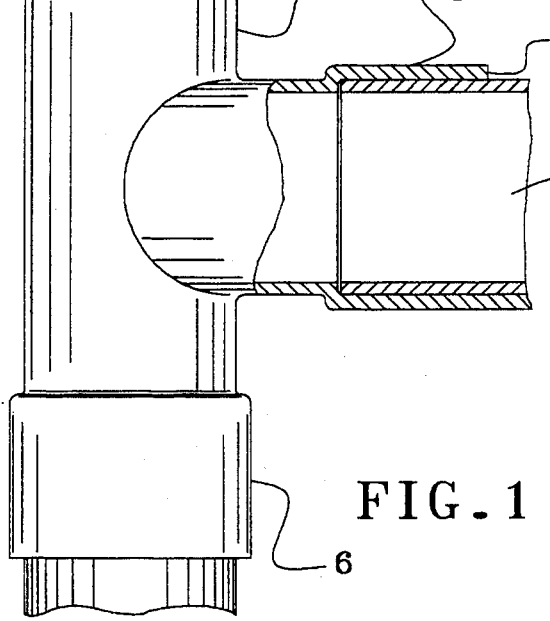
FIG. 1 is a sectional view showing a remnant of a cut-off pipe still disposed and bonded in a socket of a pipe coupling, illustrating an example of the problem to which this invention is addressed.

Referring to FIG. 1, a pre-existing pipe coupling 2 is illustrated as a "T" connector. The co-linear sockets, 4 and 6, of the coupling are connected to installed pipes. The normal socket 8 is illustrated as having disposed therein a remnant end 10 of a cut-off pipe. This figure illustrates a typical situation in which this invention can be used to great advantage.

Figure 4:
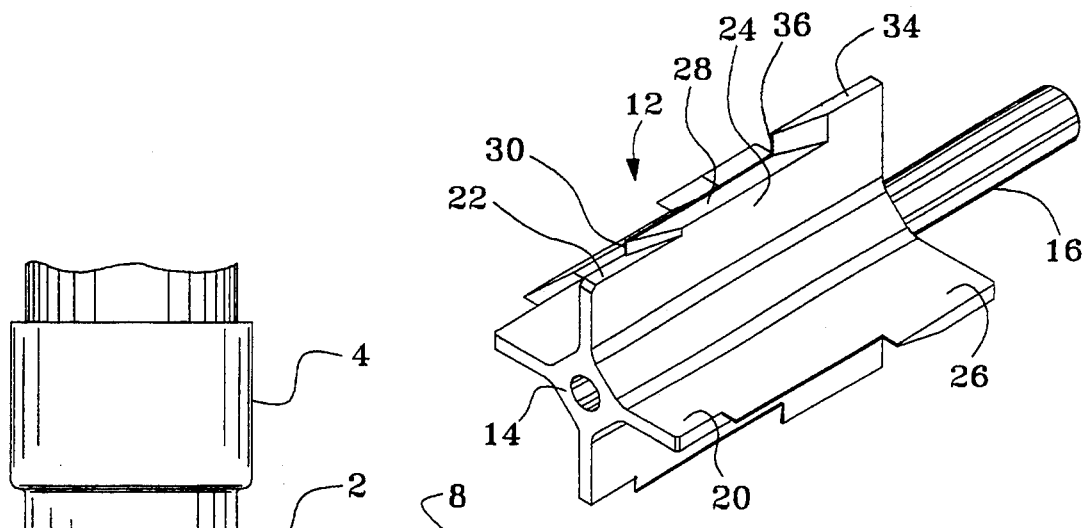
FIG. 4 is a sectional view showing the invention in operation clearing out the remnant of the cut-off pipe as illustrated in FIG. 1.
Figure 3:
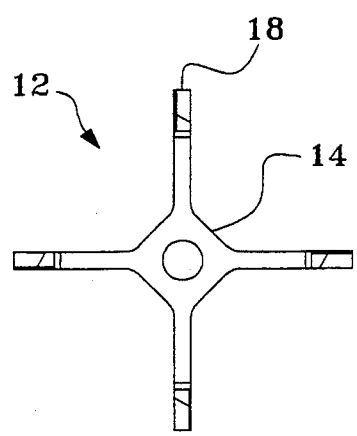
FIG. 3 is an end view of the bit of this invention.
Figure 2:
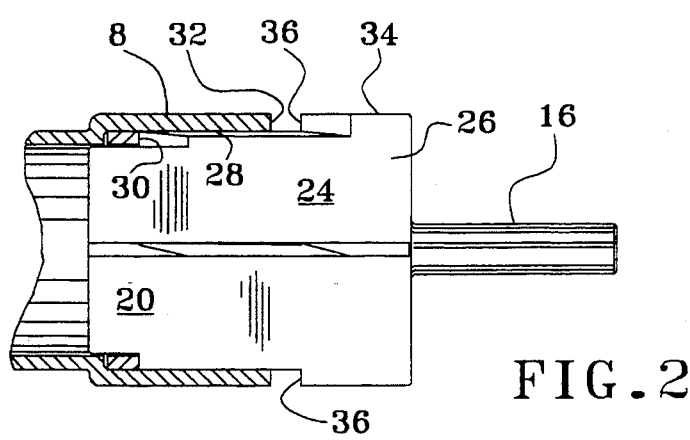
FIG. 2 is a pictorial representation of this invention.

Referring to FIGS. 2–4, a bit, generally designated 12, is illustrated as having a core shank 14 co-linear with, and affixed to or integral with an end of a drive shank 16. In use the drive shank is powered by a rotary driver such as a conventional drill. Uniformly spaced around the circumference of the core shank and extending radially therefrom are a plurality of vanes 18. These vanes can be rigidly affixed to the core shank or be integral therewith. Each vane has three distinct portions: a forward portion 20, a rearward portion 26, and an intermediate portion 24. As will be discussed in more detail, the forward portions of the vanes cooperate as a means to pilot the tool through the pipe remnant, i.e., to keep the tool centered in the remnant and therefore centered in the coupling socket being cleaned out; the intermediate portions function as a means to slice or cut through the pipe remnant removing it from the socket; and the rearward portions function as both a means to stop the tool from further penetration into the socket and as a means to scrape, i.e., clean bonding material remnants from the coupling socket lip or face.

For each vane, the forward portion has a generally flat longitudinal edge 22. The rotating diameter of the pilot portion of the bit 12, which diameter is set by a uniform radial extent of the forward portions of the vanes, is of slightly smaller dimension than the inner diameter of the pipe remnant to allow the pilot portion of the bit 12 to slidingly fit into the pipe remnant 10 as illustrated in FIG. 1. The uniformity of the radial extent of the forward portions of the vanes causes the bit to be centered in the pipe remnant 10 as the bit moves through it. In this way the forward portions of each vane cooperate to act as a pilot for the bit.

Referring to FIGS. 2-4 again, each vane has a portion 24 which is intermediate the forward portion 20 and a rearward portion 26. For each vane, a longitudinal edge 28 of the intermediate portion extends radially beyond the generally flat edge 22 of the forward portion. This greater extension forms a forward facing discontinuity which is beveled or tapered to form a first-forward facing cutting edge 30. The rotating diameter of the intermediate portion of the bit 12, which diameter is set by the uniform radial extent of the first cutting edges 30 of the intermediate portions of the vanes, closely matches the inner diameter of the coupling socket 8 to be cleaned out. The difference in rotating radiuses between the forward portion and the intermediate portion of the bit 12, which is in effect the width of the first cutting edges 30, generally equals the thickness of the pipe remnant to be cut from the socket. This ensures that the remnant can be cut from the socket without any appreciable increase in the inner diameter of the socket.

In operation, as the pilot portion of the bit (the forward portions of the vanes) guides the bit into the pipe remnant, the first cutting edges 30 of the intermediate portions of the vanes encounter the outward edge of the pipe remnant. As the bit is rotated and forced inward, these first cutting edges 30 slice or scrape away the pipe remnant. In this fashion, the bit continues cutting through the pipe remnant until the rearward portion 26 of the vanes encounter an end face 32 of the socket.

For each vane, a longitudinal edge 34 of the rearward portion extends radially beyond the generally flat edge 28 of the intermediate portion° This greater extension forms a forward facing discontinuity which is beveled or tapered to form a second forward-facing cutting edge 36. The difference in radial extents between the rearward portion and the intermediate portion is preferably at least equal to the thickness of the end face 32 of the coupling socket being cleaned out. This ensures that the second cutting edges 36 are wide enough to clean off the entire end face.

In operation as the bit moves through the socket slicing away the pipe remnant, eventually the second cutting edges 36 of the rearward portion of the vanes will encounter the end face of the socket. At that time, as the bit continues to rotate, these cutting edges will trim away any remaining bonding material on the socket end face and will generally square it off to facilitate reuse of the coupling socket.

The foregoing description and drawings were given for illustrative purposes only, it being understood that the invention is not limited to the embodiments disclosed, but is intended to embrace any and all alternatives, equivalents, modifications and rearrangements of elements falling within the scope of the invention as defined by the following claims.

We claim:

1. A device useable with a rotating driver for removing a remnant of a pipe from a pipe socket comprising:
    (a) an elongated shank for coupling the rotational power of the driver to the device,
    (b) cutting means spaced radially from the shank and powered by the shank for cutting the pipe remnant generally edgewise when the device is rotated,
    (c) non-cutting means for centering and keeping centered the device axially with respect to the pipe remnant comprising means projecting radially from the shank forward of the cutting means having a rotating diameter sufficiently smaller than the inner diameter of the pipe remnant to allow said means projecting to slidingly fit into the pipe remnant, and
    (d) means, extending perpendicularly to an axis of tool rotation, for stopping the device from excessive penetration into the socket.

2. The device according to claim 1 further comprising means for scraping an end face of the socket to remove bonding material and other materials foreign to the coupling.

3. The device according to claim 2 wherein the means for stopping the device from excessive penetration into the socket comprises the means for scraping the end face of the socket.

4. The device according to claim 1 wherein the cutting means comprises a forward-facing ring cutter coaxially connected to the shank having inner and outer diameters generally matching respectively the inner and outer diameters of the pipe remnant.

5. The device according to claim 4 further comprising means for scraping an end face of the socket to remove bonding material and other materials foreign to the coupling.

6. The device according to claim 5 wherein the means for stopping the device from excessive penetration into the socket comprises the means for scraping the end face of the socket.

7. A device useable with a rotating driver for removing a remnant of a pipe from a pipe socket comprising:
    (a) an elongated shank for coupling the rotational power of the driver to the device,
    (b) cutting means spaced radially from the shank and rotated by the shank for cutting the pipe remnant generally edgewise,
    (c) means for centering in the pipe remnant the axis of cutting means rotation comprising a plurality of angularly spaced vane means projecting radially from the shank to a uniform extent forward of the cutting means, each vane means having forward and longitudinal edges that are blunt, said plurality of vane means having a rotating diameter sufficiently smaller than the inner diameter of the pipe remnant to allow said plurality of vane means to slidingly fit into the pipe remnant, and
    (d) means for abutting an end face of the socket to prevent excessive penetration of the device into the socket.

8. The device according to claim 7 further comprising means for scraping an end face of the socket to remove bonding material and other materials foreign to the coupling.

9. The device according to claim 8 wherein the means for stopping the device from excessive penetration into the socket comprises the means for scraping the end face of the socket.

10. The device according to claim 7 wherein the cutting means comprises a forward-facing ring cutter coaxially connected to the shank having inner and outer diameters generally matching respectively the inner and outer diameters of the pipe remnant.

11. The device according to claim 10 further comprising means for scraping an end face of the socket to remove bonding material and other materials foreign to the coupling.

12. The device according to claim 11 wherein the means for stopping the device from excessive penetration into the socket comprises the means for scraping the end face of the socket.

* * * * *